United States Patent [19]

Ribi

[11] Patent Number: 4,574,909

[45] Date of Patent: Mar. 11, 1986

[54] SUSPENSION SYSTEM FOR THE REAR WHEEL OF A MOTORCYCLE

[75] Inventor: Valentino Ribi, Edificio Cenit, Panama

[73] Assignee: Diafil International S.A., Edificio Ford, Panama

[21] Appl. No.: 525,536

[22] Filed: Aug. 23, 1983

[30] Foreign Application Priority Data

Aug. 27, 1982 [CH] Switzerland ............... 5095/82

[51] Int. Cl.⁴ ............................................. B62K 25/12
[52] U.S. Cl. ..................................... 180/227; 280/284
[58] Field of Search .................. 180/227, 219; 280/284

[56] References Cited

U.S. PATENT DOCUMENTS

| | | | |
|---|---|---|---|
| 4,076,271 | 2/1978 | Doncque | 180/227 |
| 4,322,088 | 3/1982 | Miyakoshi | 180/227 |
| 4,415,057 | 11/1983 | Yamaguchi | 180/227 |

FOREIGN PATENT DOCUMENTS 3238019  4/1983  Fed. Rep. of Germany ...... 180/227

*Primary Examiner*—John A. Pekar
*Attorney, Agent, or Firm*—Pollock, Vande Sande & Priddy

[57] ABSTRACT

In an elastic suspension system provided with a shock absorber (6, 106) for the rear wheel (5) of a motorcycle, the shock absorber (6, 106) is pivotally connected by its lower end to a shock absorber-supporting bell crank (11) fulcrumed about the rear wheel fork (3). A guide arm is articulatedly connected by one end to the shock absorber-supporting bell crank (11), and by its other end to the motorcycle frame (1), at a point (15) higher than the pivot point (2) for the fork (3), and in such a manner as to obtain an articulated quadrilateral (2, 15, 13, 12) with no intersecting sides. This arrangement increases the excursion of the shock absorber (6, 106) and makes it possible to provide only one shock absorber (6, 106), arranged in the same vertical plane as the rear wheel (5).

3 Claims, 2 Drawing Figures

SUSPENSION SYSTEM FOR THE REAR WHEEL OF A MOTORCYCLE

BACKGROUND AND SUMMARY OF THE INVENTION

The object of the invention is an elastic suspension system provided with a shock absorber intended for the rear wheel of a motorcycle, in which the rear wheel is carried by a fork that is pivoted to the motorcycle frame for a rocking movement thereabout, and the shock absorber is pivotally connected by its upper end to the motorcycle frame, at a point located at a higher level than the pivot point for the fork, while by its lower end it is pivotally connected to a shock absorber-supporting bell crank that is fulcrumed onto the fork for a pivoting movement thereabout, and has one end of a guide arm articulatedly connected thereto, the opposite end of said arm being articulatedly connected to the motorcycle frame.

In prior art suspension systems of this kind, the motorcycle frame, the fork, the guide arm, and the arm of the shock absorber-supporting lever which is included between the said lever fulcrum about the fork and the pivotal connection of said bell crank to the guide arm, form an articulated quadrilateral presenting at least two intersecting sides. More particularly, in these known suspension systems, when the shock absorber-supporting lever is in the form of a two-armed lever, the shock absorber is pivotally connected to the arm of this lever which is remote from the motorcycle frame, while the guide arm is articulatedly connected by one end to the said lever arm which is near to the motorcycle frame, and by its opposite end it is articulatingly connected to the motorcycle frame, at a lower position than the pivot point for the fork. Similarly, when in the known suspension systems of the aforementioned kind the shock absorber-supporting lever is in the form of a one-armed lever, to which both the shock absorber and the guide arm are pivotally connected, the guide arm has its opposite end articulatedly connected to the motorcycle frame at a lower position than the pivot point for the fork. In both instances, therefore, the pivotal connections of the shock absorber and of the guide arm to the motorcycle frame are located respectively above and below the pivot point for the fork. Moreover, while the suspension system is performing its elastic movement, the guide arm operates as a link.

The known suspension systems of the aforementioned kind however have the drawback of a much reduced shock absorber stroke. Additionally, while the suspension system is performing its elastic movement, the shock absorber is angularly moved, to a considerable extent, about the point of its pivotal connection to the motorcycle frame, and is caused to project backwards, so that it would bump into the rear wheel, or would unacceptably limit the movement of the wheel, if it were located in the same vertical plane as the rear wheel itself. This is why in the known elastic suspension systems of the aforementioned kind it was not possible to provide only one shock absorber located in the same vertical plane as the rear wheel, but two shock absorbers needed to be provided, arranged at the respective sides of the rear wheel.

The object of the invention is to eliminate the aforementioned drawbacks, and to provide an elastic suspension system of the kind initially disclosed, in which a considerably increased shock absorber stroke is obtained, and in which the shock absorber is not substantially moved angularly owing to the elastic movement of the rear wheel, so that it does not interfere with this wheel, whereby it is possible to provide only one shock absorber, intermediately arranged in the same vertical plane as the rear wheel.

The invention resides in the feature that the guide arm, and the portion of the shock absorber-supporting bell crank which is included between the fulcrum of said bell crank and the point of its pivotal connection to the guide arm, and the portion of the fork which is included between the fulcrum of the shock absorber-supporting bell crank and the pivot point for the fork, and that section of the motorcycle frame which is included between the pivot point for the fork and the articulation for the guide arm, form an articulated quadrilateral with no intersecting sides.

According to one advantageous embodiment of the invention, the guide arm has one end pivotally connected to the motorcycle frame, at a higher position than the pivot point for the fork. The opposite end of the guide arm may be pivotally connected to the shock absorber-supporting bell crank at any point thereof, which however should be such as to determine the uplifting of the pivot point for the pivotal connection of the shock absorber to the shock absorber-supporting bell crank, whenever the fork rocks in the upward direction about the pivot point for its pivotal connection to the motorcycle frame, as a result of the elastic movement of the rear wheel.

In one possible way of carrying out the construction of the elastic suspension system according to the just disclosed embodiment, the shock absorber-supporting bell crank consists of a two-armed lever, and the lower end of the shock absorber is articulatedly connected to that arm of the shock absorber-supporting bell crank which is adjacent to the motorcycle frame, while the guide arm is articulatedly connected to that arm of the shock absorber-supporting bell crank which is remote from the motorcycle frame.

The spring means of the suspension system may be arranged in any desired manner, and may act on the fork either directly or indirectly, through any part of the articulated quadrilateral associated with the fork. Preferably, however, the spring means of the suspension system are combined in known manner with the shock absorber and, for example, consist of at least one helical spring arranged co-axially to the shock absorber.

BRIEF DESCRIPTION OF THE DRAWINGS

One embodiment of the present invention is diagrammatically shown in the annexed drawing, in which.

DESCRIPTION OF THE PREFERRED EMBODIMENT

Figures 1, 2:
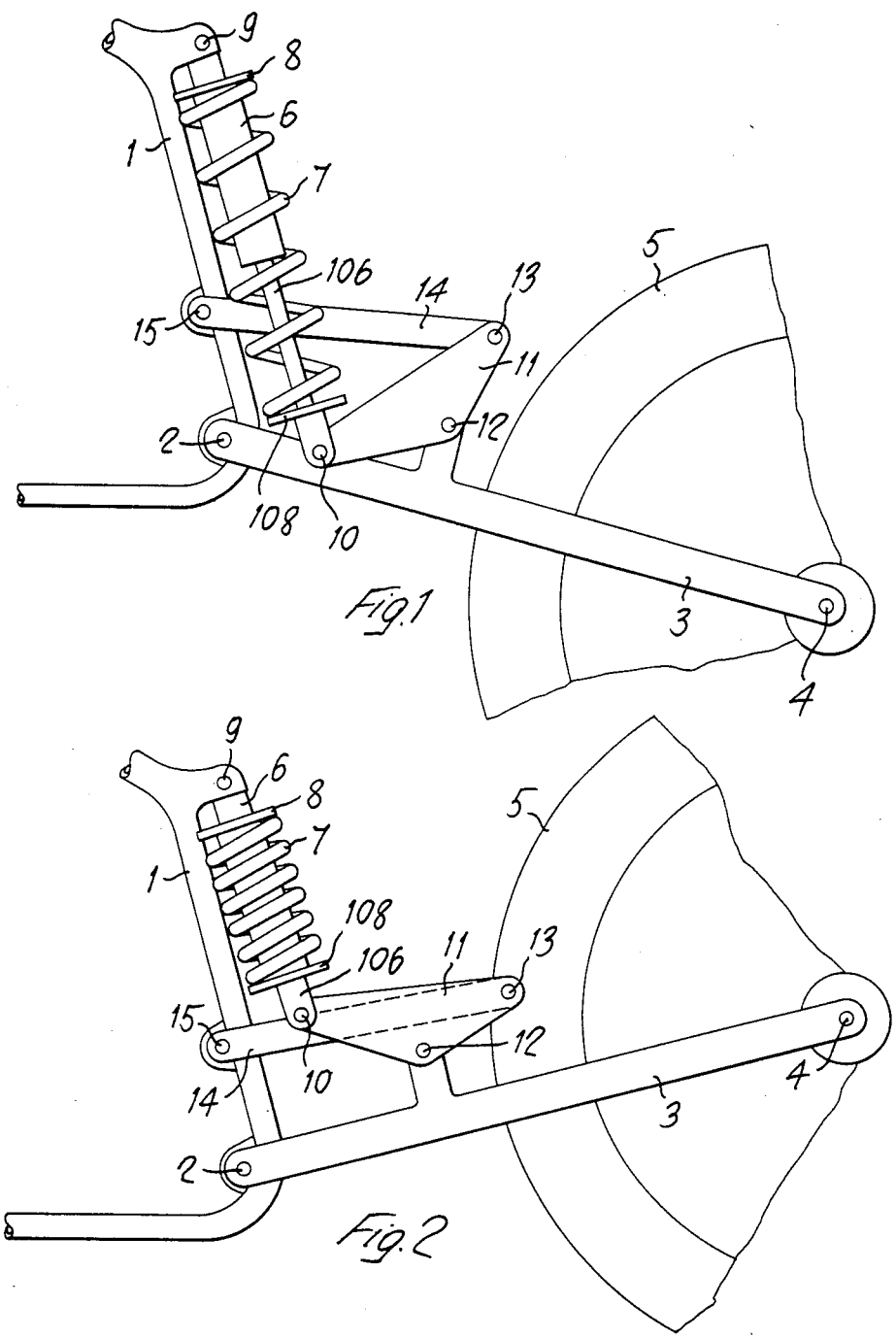
FIG. 1 is a side elevational view of the elastic suspension system for the rear wheel of a motorcycle, according to the invention, in which the said elastic suspension system is shown in rest condition, i.e., with the motorcycle in its unloaded state, and with the motorcycle frame swung into its highest position with respect to the motorcycle rear wheel.
FIG. 2 is a side elevational view in which the same elastic suspension system as in FIG. 1 is shown in the limit condition of its downward movement, i.e., with the motorcycle in its loaded state, and with the motorcycle frame swung into its lowermost position with respect to the motorcycle rear wheel.

Referring to the Figures, numeral 1 denotes the frame of a motorcycle. The fork 3 which at one end carries the axle 4 of the motorcycle rear wheel 5, is rockably mounted to frame 1 by its opposite end pivoted at 2. The body of the shock absorber is associated with the rear wheel 5, and fitted with the elastic suspension helical spring 7. The spring 7 is wound round the shock absorber, and is mounted between a spring-retaining washer 8 integral with the shock absorber body 6, and a spring-retaining washer 108 integral with the stem 106 of the shock absorber plunger.

By its upper end, i.e., the upper end of its body 6, the shock absorber is pivotally connected at 9 to the motorcycle frame 1, while by its lower end, i.e., the free end of stem 106, it is pivotally connected at 10 to one of the arms of a two-armed, shock absorber-supporting bell crank 11, which is fulcrumed at 12 for a rocking movement about fork 3. To the other arm of the shock absorber-supporting bell crank 11 there is pivotally connected at 13 one end of a guide arm 14 having its other end pivotally connected at 15 to the motorcycle frame 1.

The articulated connection 15 of the guide arm 14 to the motorcycle frame 1 is located above the pivot point 2 for the pivotal connection of fork 3 to frame 1. The arm of the shock absorber-supporting bell crank 11 to which the lower end of the shock absorber is articulatingly connected at 10 extends in the forward direction relatively to the direction of movement of the motorcycle, i.e., toward the motorcycle frame 1 and the pivot point 2 for the fork 3, whereas the other arm of the shock absorber-supporting bell crank 11 to which the guide arm 14 is pivotally connected at 13, extends in the opposite direction, i.e., backwards, toward the axle 4 of the rear wheel 5.

Thus, an articulated quadrilateral is obtained, one side of which is formed by that portion of the motorcycle frame 1 which is included between the pivot point 2 for the fork 3 and the articulated connection 15 for the guide arm 14. Two other sides of the said articulated quadrilateral are formed by the guide arm 14 and by that portion of the shock absorber-supporting bell crank 11 which is included between the fulcrum 12 of this bell crank 11 about the fork 3 and the pivotal connection 13 of the guide arm 14 to the same shock absorber-supporting bell crank 11. The fourth side of the articulated quadrilateral is formed by that portion of fork 3 which is included between the fulcrum 12 of the shock absorber-supporting bell crank 11 about fork 3, and the pivot point 2 for the pivotal connection of fork 3 to the motorcycle frame 1. In the drawing, it clearly appears that the just described articulated quadrilateral has no intersecting sides.

The pivotal connection 10 of the lower end of the shock absorber to the shock absorber-supporting bell crank 11, and the pivotal connection 13 of the guide arm 14 to the said shock absorber-supporting bell crank 11, and the fulcrum 12 of the shock absorber-supporting bell crank 11 about fork 3, are not in an aligned relation, but are located at the vertices of a triangle.

In FIG. 1 there is shown the rest condition of the elastic suspension system for the rear wheel 5 and of the respective shock absorber 6, 106. The frame 1 of an unloaded motorcycle is now situated in its highest position relatively to wheel 5. The shock absorber 6, 106 and the spring 7 are extended. During the elastic movement of the suspension system, the fork 3 of the rear wheel 5 will rock about its pivot point 2 in the upward direction, relative to the motorcycle frame 1. Thus, not only is the fulcrum 12 of the shock absorber-supporting bell crank 11 is also lifted up, but at the same time the guide arm 14 also performs a strut-like function and moves angularly the said shock absorber-supporting bell crank 11, so as to lift up the arm of said bell crank to which the lower end of the shock absorber is pivotally connected at 10. The spring 7 and the shock absorber 6, 106 will be contracted as far as to the limit of the elastic suspension movement, i.e., the lowermost position of the motorcycle frame 1 with respect to the motorcycle rear wheel 5, as shown in FIG. 2.

In comparing FIGS. 1 and 2, it clearly appears that with the elastic movement of the suspension system, the excursion of the shock absorber 6, 106 and the spring 7 is substantially long. Moreover, since the shock absorber 6, 106 is not sensibly moved angularly and does not project backward to such an extent as to come to bump into the rear wheel 5, it is possible to provide one shock absorber 6, 106, arranged in the same vertical plane as the rear wheel 5. In this instance, also two shock absorber-supporting bell cranks 11 will be provided, respectively arranged on the opposite sides of the shock absorber 6, 106, and each fulcrumed about the corresponding arm of fork 3. Each one of these shock absorber-supporting bell cranks 11 will be pivotally connected to the motorcycle frame 1, through the corresponding guide arm 14. Therefore, two articulated quadrilaterals of the above-disclosed type will be provided, respectively arranged on the opposite sides of shock absorber 6, 106 and the rear wheel 5.

In the drawing, it further appears that with the elastic movement of the suspension system for the rear wheel 5, the pivotal connection 10 for the lower end of shock absorber 6, 106 is practically moved along a rectilinear path, substantially co-axial to the shock absorber 6, 106, or along an almost rectilinear path. By properly dimensioning the sides of the above-disclosed articulated quadrilateral, i.e., by suitably changing the geometry of the articulated quadrilateral, it is possible to achieve also a certain progressiveness of the elastic force opposing the elastic movement of the elastic suspension system.

I claim:
1. An elastic rear wheel suspension for a motorcycle comprising
   (a) a motorcycle frame (1);
   (b) a fork (3) pivotally connected to said frame at a pivot point (2) for upward and downward movement relative thereto and rotatably supporting a rear wheel (4);
   (c) a shock absorber having an upper end (6) and a lower end (106) and disposed between said frame and said fork for damping relative movement between said frame and said fork, the upper end of said shock absorber being pivotally connected to said frame at a pivot point (9) located at a higher level than the pivot point (2) of said fork to said frame;
   (d) a two-armed shock absorber-supporting bell crank (11) pivotally mounted on said fork and having a forward end directed toward said frame and a rear end directed toward said rear wheel, the lower end of said shock absorber being pivotally con- nected to said fore end of said shock absorber-supporting bell crank; and (e) a guide arm (14) having a forward end directed toward said frame and a rear end directed toward said rear wheel, said rear end of said guide arm being pivotally connected to said rear end of said shock absorber-supporting bell crank, while the forward end of said guide arm is pivotally connected to said frame at a pivot point which is included between said pivot point of said fork to said frame and said pivot point of said upper end of said shock absorber to said frame.

2. An elastic rear wheel suspension for a motorcycle according to claim 1, including spring means associated with said shock absorber.

3. An elastic rear wheel suspension for a motorcycle according to claim 1, in which only one shock absorber is arranged in the same vertical plane as said rear wheel.

* * * * *